No. 659,376. Patented Oct. 9, 1900.
B. F. NEDROW.
DRAG SAW.
(Application filed Mar. 12, 1900.)
(No Model.)
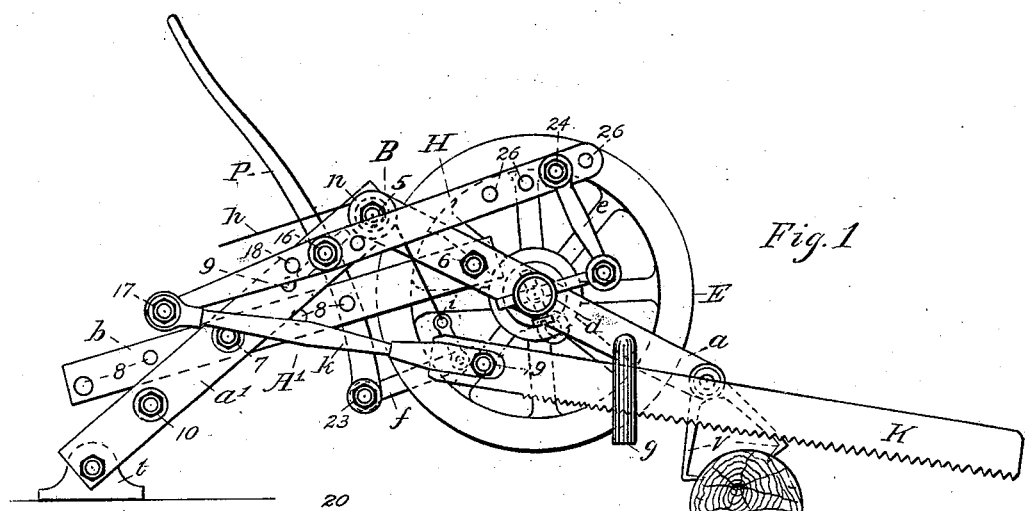
Fig. 1
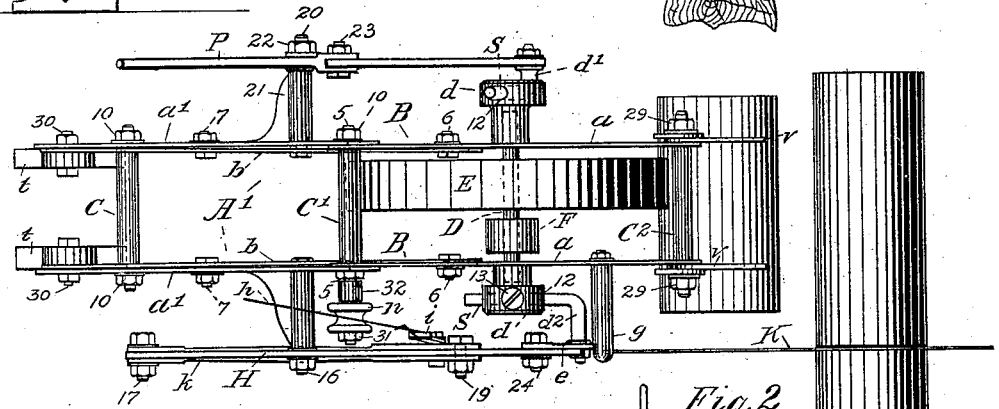
Fig. 2
Fig. 3
WITNESSES:
Rupert Schultheiss
Edwin J. Bailey
INVENTOR.
Benjaman F. Nedrow
BY Frank E. Adams
ATTORNEY.

UNITED STATES PATENT OFFICE.

BENJAMAN F. NEDROW, OF ANACORTES, WASHINGTON.

DRAG-SAW.

SPECIFICATION forming part of Letters Patent No. 659,376, dated October 9, 1900.

Application filed March 12, 1900. Serial No. 8,348. (No model.)

*To all whom it may concern:*

Be it known that I, BENJAMAN F. NEDROW, a citizen of the United States of America, and a resident of Anacortes, county of Skagit, and State of Washington, have invented certain new and useful Improvements in Drag-Saws, of which the following is a specification.

My invention relates to improvements in machines known as "drag-saws;" and I have for the object thereof to provide a device of this class which shall embody essential features of simplicity, durability, and general efficiency and be readily adjustable. I attain this object by the construction, combinations, and arrangement of the several parts, as illustrated on the accompanying drawings and set forth in the following specification.

With reference to the drawings forming a part of this specification, Figure 1 is a side elevation of my improved drag-saw, indicated in a position for operation upon a log to which it is anchored. Fig. 2 is a plan view of the machine as disclosed in Fig. 1, but indicating same anchored to one log while adapted for operation to saw another; and Fig. 3 is an end elevation of the machine as viewed from the right in the foregoing figures.

Similar characters of reference designate corresponding parts throughout the several views of the drawings.

I have provided a main frame, as A′, adapted to support the several parts of my device, and which comprises opposite side members B, each being composed of legs $a$ and $a'$, which converge upwardly and are engaged at their upper ends with a suitable pivot 5, and a suitable tie $b$ is introduced and is attached to the leg $a$ by a bolt, as 6, and to leg $a'$ by a similar bolt 7, which is adapted to engage with the tie $b$ in any one of a plurality of apertures 8, provided therein, and thereby determines the separation of the lower ends of the legs $a$ and $a'$, and to provide for a greater degree of adjustment of the legs a plurality of like apertures 9 may be provided in the leg $a'$. Thus side members are provided which are substantially of A shape and are readily adjustable to vary the height thereof and are adapted to be locked in adjusted positions.

To distance the opposite side members B, suitable struts, as C, C′, and C², are positioned therebetween and the ends thereof are reduced in diameter to engage suitable apertures in the legs $a$ and $a'$, adjacent the ends thereof and to have suitable threaded connection therewith or with nuts, as 10, which are adapted to clamp said side members to the shoulders formed by the reduction of said ends, or the struts and side members may be joined in any other well-known manner.

Suitable bearings are provided in the legs $a$ to journal a shaft, as D, which is disposed transversely the main frame and has threaded engagements with crank-hubs, as $d$, provided at each extremity of the shaft and preferably engaged therewith by threads of a suitable hand—*i. e.*, either right or left hand—to normally oppose the torsional strain applied at the shaft ends. These hubs $d$ have each a transverse socket 12, adapted to receive the shank S of a suitable crank, as $d'$ or $d^2$, and suitable means, as a set-screw 13, is introduced to secure the crank at the required radius. Upon the shaft D is also provided a fly-wheel E and a pulley, as F, which may be employed to receive power from a belt driven by an engine or other like means. A lever, as P, may also be employed to operate the shaft D and is engaged with a suitable fulcrum 20, provided at the outer extremity of a bracket, as 21, positioned upon one of the legs $a'$, and a nut, as 22, is engaged with said fulcrum to retain the lever. A suitable connecting-rod $f$ is engaged with one end of the lever P by means of a bolt, as 23, and is suitably formed at the opposite end to couple with the crank-pin of the crank $d'$ in any well-known manner, and the free end of the lever is suitably formed to provide a handle.

To provide for a reciprocative movement of the saw K, as determined by the revolution of the crank $d^2$, a lever, as H, is suitably engaged with a fulcrum 16 at the opposite side of the main frame from the lever P and in a manner similar thereto and is coupled to the crank-pin of the crank $d^2$ by a connecting-rod $e$, which has adjustable connection with said lever by means of a removable bolt 24 and a plurality of apertures 26, provided in said lever, and is suitably formed to receive the crank-pin of the crank $d^2$ in any well-known manner, while a rod, as $k$, is engaged with the opposite end of said lever by suitable means, as a bolt 17, and with the saw by a similar bolt 19. The lever H may be provided with a plurality of apertures 18, whereby it may be adjusted on the fulcrum 16 to regulate the travel of the saw K.

A suitable guide, as $g$, is positioned on one of the legs $a$ to engage the saw when entering the cut and preferably comprises a rod bent at right angles and positioned with one end abutting said leg, while in the opposite end is provided a slot, as 27, to receive the saw.

A suitable holdfast is provided at the lower extremity of the legs $a$, whereby the main frame $A'$ may be attached to a log or other convenient anchor. This holdfast preferably comprises span-dogs, as $v$, pivotally engaged with the outer extremities of the strut $C^2$ and retained by suitable nuts 29, and at the lower extremities of the legs $a'$ blocks, as $t$, are engaged therewith by suitable bolts 30 and are adapted to provide suitable feet for the legs.

To raise the saw K from the cut, a line, as $h$, is engaged with the rod $k$ by means of a suitable connection, as a link $i$, and extends upwardly over an idler $n$, which is suitably journaled upon an extended end of the strut $C'$ and retained between a nut 31 and collar 32, and it is obvious that the outer end of said line may be secured to hold the saw in a raised position while shifting the main frame or the saw-log for a new cut.

It will be clearly understood that the main frame $A'$ is rendered adjustable by removing the bolts 7 to release the ties $b$, when the legs $a$ and $a'$ may be closed or opened on the pivots 5 to change the pitch thereof, as desired, and thereby adjust the fulcra 16 and 20 and shaft D as to elevation, whereby the saw is made to reciprocate in a plane more or less horizontal, as may be desired. Furthermore, the travel of the saw may be regulated by adjusting the lever H, connecting-rod $e$, or the radius of the crank-pin of the crank $d^2$, and the speed thereof may be regulated by adjusting the throw of the crank $d'$.

Obviously the main frame $A'$ may be attached to the log upon which it may be desired to operate by setting the span-dogs $v$ to engage therewith, as disclosed in Fig. 1, and the side members B may be so adjusted that the saw is made to enter the cut with its cutting edge more or less horizontal, and during operations upon logs of extreme diameter the frame may be so adjusted during each cut, and thereby insure a more perfect operation of the saw; also, the machine thus provided is manifestly adapted to operate upon other logs than the one to which it may be anchored, in a manner clearly indicated in Fig. 2.

When desirable to adjust the cranks $d'$ or $d^2$ to vary the throw thereof, the set-screws 13 are turned to release same, and the shanks S of the cranks are free for longitudinal movement in the sockets 12.

Having thus described my invention, what I claim, and desire to secure by Letters Patent, is—

1. In a device of the class described; a main frame comprising opposite side members, each providing a pair of legs converging upwardly, means to pivotally connect said legs at their upper ends, a tie, means to lock said tie to the legs, a holdfast engaged with the lower extremity of one leg, and means to distance the side members; substantially as shown and described.

2. In a device of the class described; a main frame comprising opposite side members, each providing a pair of legs converging upwardly, means to pivotally connect the legs at their upper ends, a tie, means to lock said tie to the legs, a holdfast engaged with the lower extremity of one leg and a foot pivotally engaged with the lower extremity of the other leg, and suitable means to distance the side members; substantially as shown and described.

3. In a machine of the nature indicated, a frame comprising opposite side members each composed of a pair of legs pivoted together at their upper ends, a tie between the two legs of each pair, a rotatable shaft extending transversely between corresponding legs of the side members and journaled upon said legs, a lever fulcrumed upon one side of the frame, operative connections at the same side of the frame between said lever and the shaft and said lever and a saw, an operating-lever fulcrumed upon the opposite side of the frame, and operative connections at the same side of the frame between said operating-lever and the said shaft, the said levers being fulcrumed upon the legs not carrying the said shaft; substantially as described.

4. In a machine of the nature indicated, a main frame comprising side members each composed of a pair of legs pivoted together at their upper ends, means for spacing said side members from each other, a tie pivoted upon one leg of each side member and having means for adjustably engaging the opposite leg of its side member, a rotatable shaft extending between corresponding legs of the opposite side members and journaled thereon, a fly-wheel upon said shaft between said legs, cranks at the opposite ends of said shaft, an operating-lever journaled to a leg not carrying said shaft, a link connecting said lever to the shaft-crank on the same side of the frame as is said lever, a second lever fulcrumed to a leg not carrying said shaft and upon the side of the frame opposite said operating-lever, means for adjusting the fulcrum of said second lever, a link connecting one end of said second lever to the shaft-crank at that side of the frame, said link having adjustable connection with said lever, and a link connecting the opposite end of said lever with a saw; substantially as described.

Signed by me at Anacortes, State of Washington, this 27th day of February, 1900.

BENJAMAN F. NEDROW.

Witnesses:
H. D. ALLISON,
V. J. KNAPP.